United States Patent
Kung

(10) Patent No.: US 6,909,541 B2
(45) Date of Patent: Jun. 21, 2005

(54) DEVICE CAPABLE OF EXCHANGING IMAGE PROJECTION DIRECTION

(75) Inventor: Su-Min Kung, Shi-Jr (TW)

(73) Assignee: Hunter Optical Co., Ltd., Taipei Hsien (TW)

( * ) Notice: Subject to any disclaimer, the term of this patent is extended or adjusted under 35 U.S.C. 154(b) by 125 days.

(21) Appl. No.: 10/390,633

(22) Filed: Mar. 19, 2003

(65) Prior Publication Data

US 2004/0125475 A1 Jul. 1, 2004

(30) Foreign Application Priority Data

Dec. 30, 2002 (TW) .................................... 91221479 U

(51) Int. Cl.[7] .............................................. G02B 21/00
(52) U.S. Cl. ...................... 359/381; 359/421; 359/821
(58) Field of Search ................ 359/368, 372, 359/374, 381, 384, 419, 421, 821

(56) References Cited

U.S. PATENT DOCUMENTS 5,121,220 A * 6/1992 Nakamoto .................. 359/419

* cited by examiner

Primary Examiner—Mark A. Robinson
Assistant Examiner—Alessandro Amari
(74) Attorney, Agent, or Firm—Dennison, Schultz, Dougherty & MacDonald

(57) ABSTRACT

A device capable of exchanging image projection directions includes an inner body provided with an internal reflector having adjustable angles and a horizontal light permeation aperture; an accommodation tube formed at the rear of the inner body and an upper light permeation aperture formed at the top of the accommodation tube; an outer accommodation barrel disposed with at least two connection openings at the outer periphery thereof; and an inner accommodation barrel disposed with a long orifice and an outer connection opening, and is further flexibly connected into the outer accommodation barrel and fixed around the accommodation tube, such that the long orifice corresponds to the upper light permeation aperture for forming a path for light beams. The connection openings are connected to binocular connection barrels having various magnifications in advance, thereby viewing images with different magnifications and viewing ranges without dismantling or assembly of the binocular connection barrels.

4 Claims, 9 Drawing Sheets

DEVICE CAPABLE OF EXCHANGING IMAGE PROJECTION DIRECTION

BACKGROUND OF THE INVENTION (a) Field of the Invention

The invention relates to a device capable of exchanging image projection directions, and more particularly, to an innovation with respect to the U.S. patent application Ser. No. 10/114,096.

(b) Description of the Prior Art

According to the device capable of exchanging image projection directions as disclosed by the U.S. patent application Ser. No. 10/114,096 the invention comprises a housing pivotally disposed with a reflector having adjustable angles therein. The housing is further provided with an image incident opening, a first and a second eyepiece openings for viewing. The view direction of the first eyepiece opening coincides with the image incident direction, and the view direction of the second eyepiece opening is perpendicular to the image incident direction. The above structure indeed is quite practical, however, shortcomings as described below yet arise when the device is used in the long term:

1. When the device is applied in binoculars, it is necessary to insert and connect the second eyepiece opening (115) to a binocular connection barrel (450) having an appropriate magnification, and the first eyepiece opening (114) is connected to a binocular barrel (470) in order to allow the eyes of a viewer to view images through the binocular barrel (450). However, if the user wishes to view with other binocular connection barrels (450) having larger magnifications or view ranges, binocular connection barrels (450) with various specifications must be dismantled from or assembled to the second eyepiece opening (115). The process is rather complicated for the user; in addition, it is quite inconvenient for the user to carry binocular connection barrels (450) with various specifications, thus adding another shortcoming to the binocular device.

2. When the device is applied in zoom microscopes, the second eyepiece opening may be connected to a semi-transparent ground glass (318). Micro images are shown onto the surface of the ground glass (318) using reflections through an internal reflector located in a housing thereof. Nevertheless, such function is limited and therefore images cannot be projected onto a table surface or a wall at enlarged scales.

SUMMARY OF THE INVENTION

An object of the invention is to provide a device capable of exchanging image projection directions. The device particularly comprises a rotatable outer accommodation barrel provided with two or more connection openings at the outer periphery thereof. By rotating the outer accommodation barrel with an angle, one of the connection openings is positioned to correspond to a mirror surface of a reflector, and the connection openings are connected to binocular connection barrels having various magnifications, thereby readily achieving the purpose of viewing images with different magnifications without dismantling and assembly of the device The other object of the invention is to provide a device capable of exchanging image projection directions, wherein the plurality of connection openings at the outer accommodation barrel may choose connected semi-transparent ground glass such that the device displays the image of a micro object onto a horizontal plane, a vertical wall or the surface of a ground glass and further applilying to zoom microscope.

DESCRIPTION OF THE PREFERRED EMBODIMENTS

Figure 1:
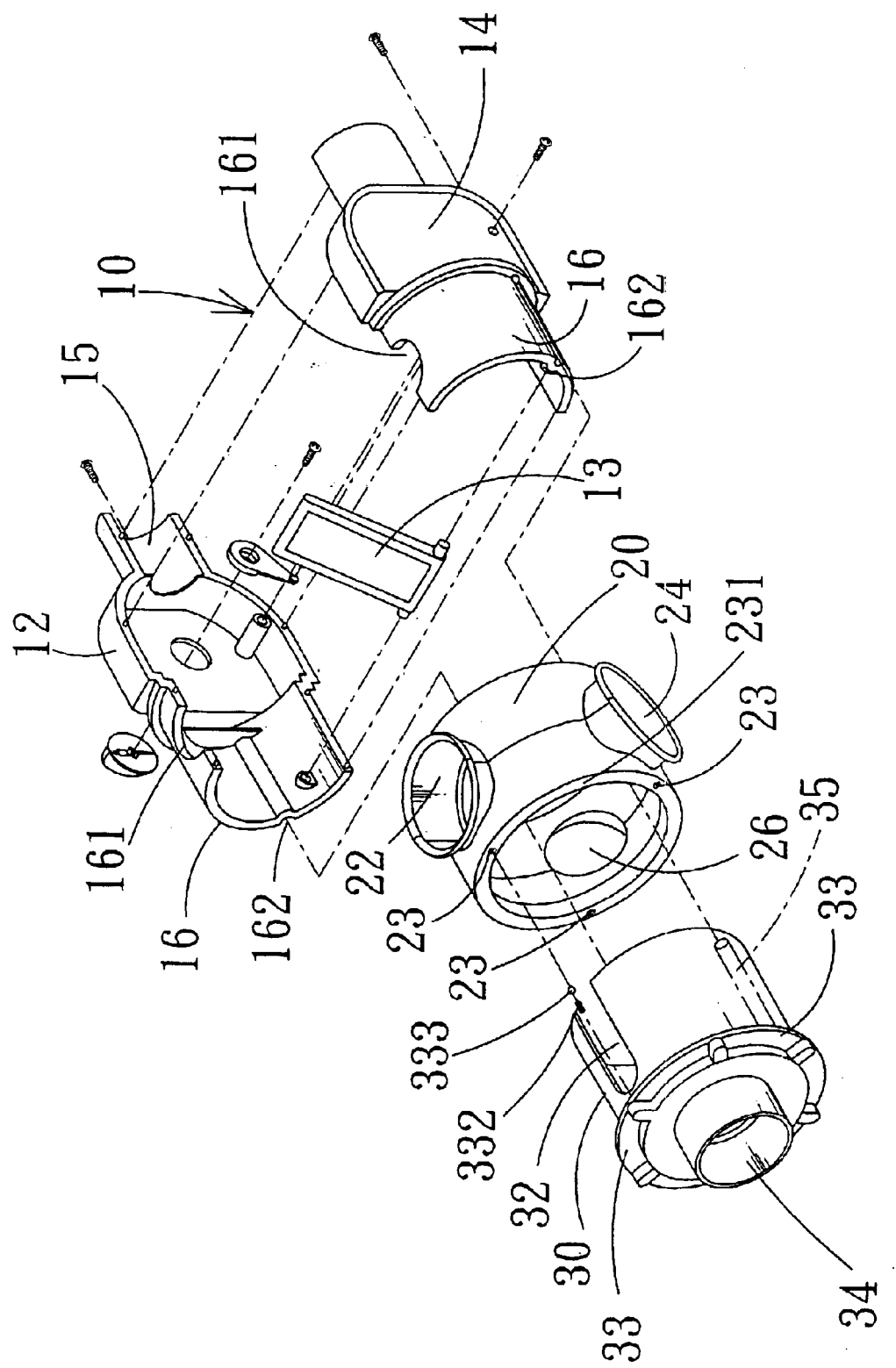
FIG. 1 shows an exploded elevational view according to the invention.
Figure 2:
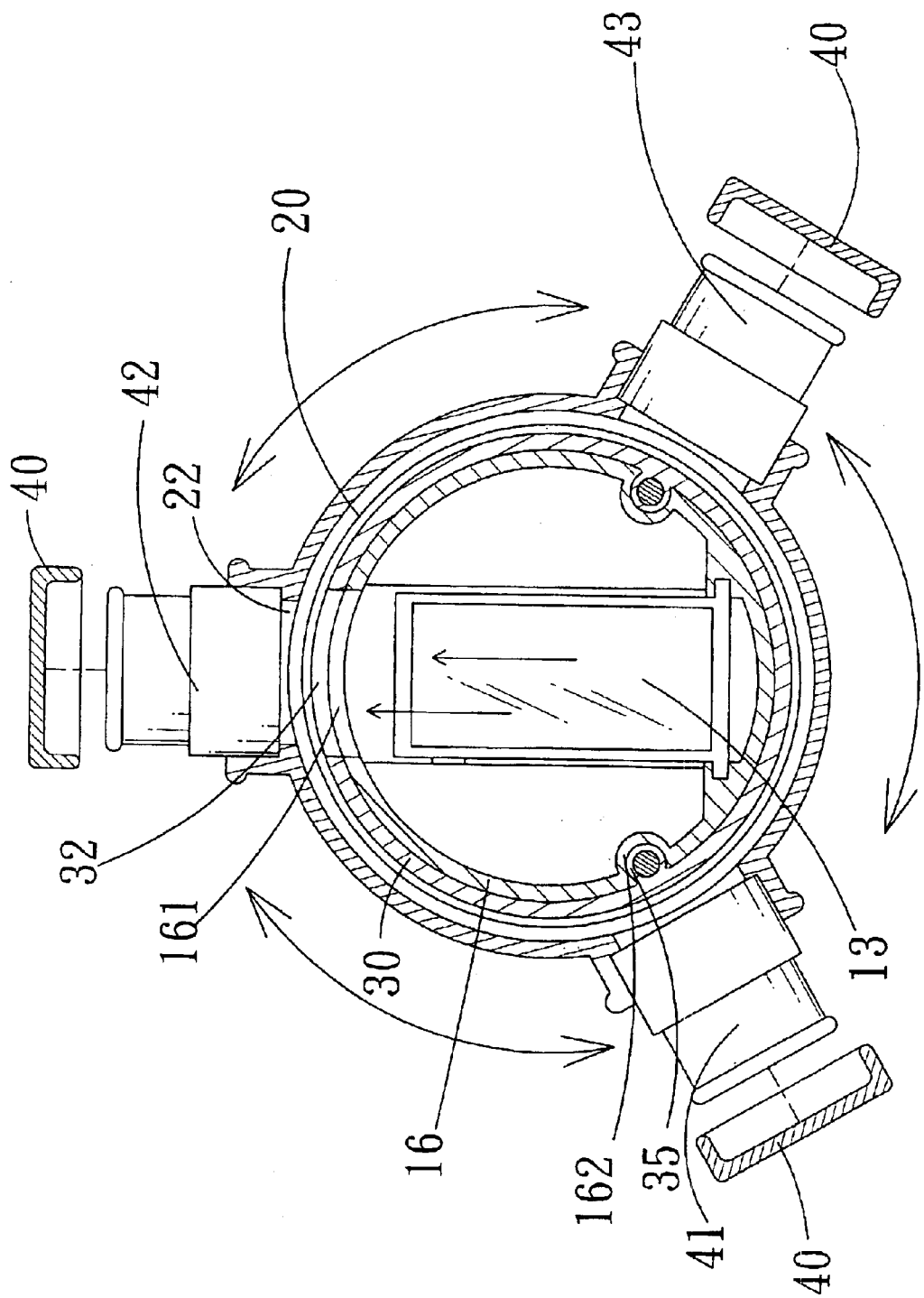
FIG. 2 shows a sectional view illustrating the movements according to the invention connected to binocular connection barrels.
Figure 3:
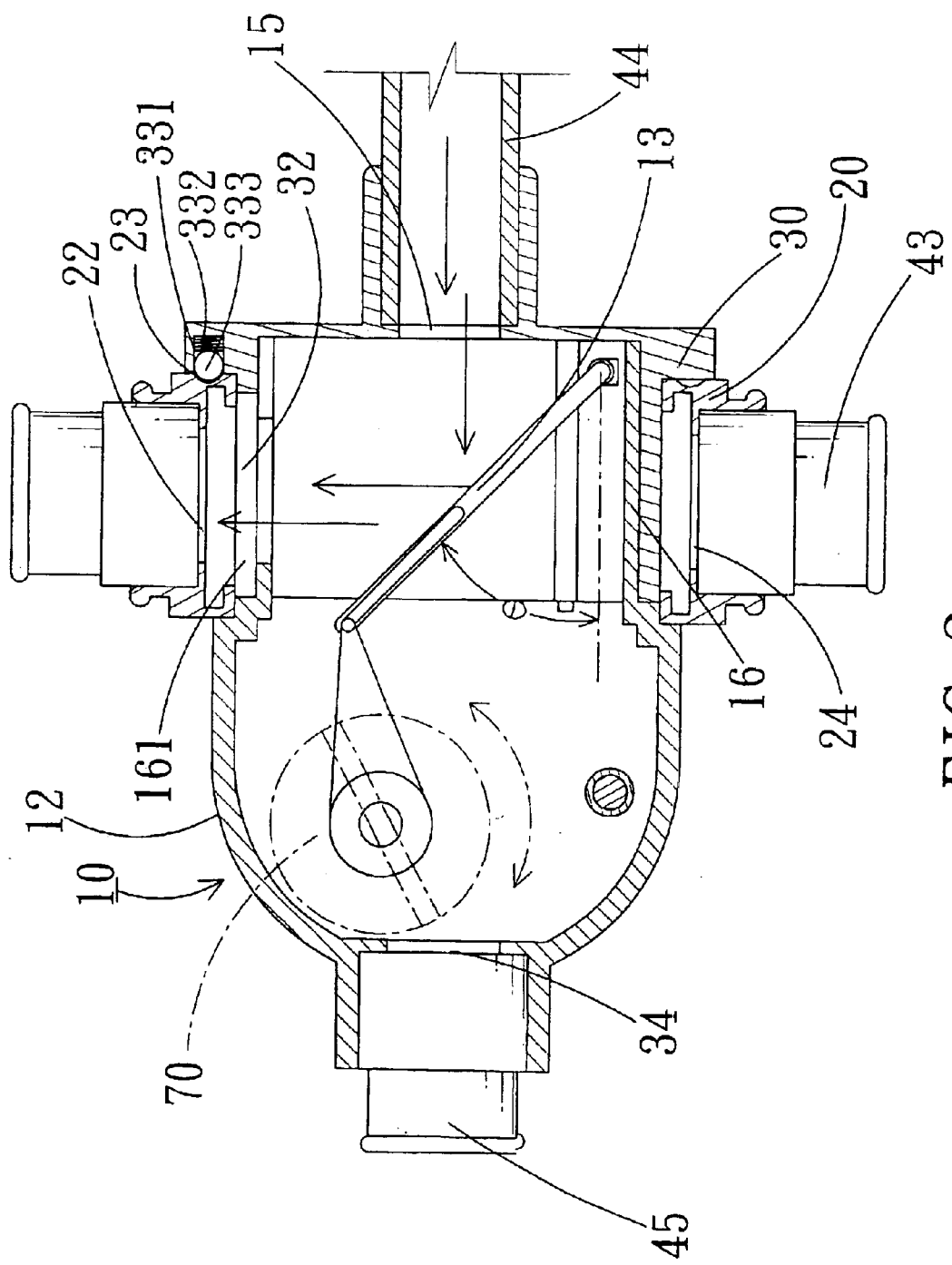
FIG. 3 shows another sectional view illustrating the movements according to the invention connected to binocular connection barrels.

To achieve the above objects, the device capable of exchanging image projection directions in accordance with the invention comprises:

an inner body 10 consisted of a right and a left housings 12 and 14, an internal reflector 13 having adjustable angles and a horizontal light permeation aperture 15 which are disposed in the inner body 10 (as shown in FIGS. 1 and 2); characterized in that:

an accommodation tube 16 formed at the rear of the inner body 10 and an upper light permeation aperture 161 formed at the top of the accommodation tube 16;

an outer accommodation barrel 20 disposed with at least two connection openings 22, 24 and 26 at the outer periphery thereof; and an inner accommodation barrel 30 disposed with a long orifice 32 and an outer connection opening 34, and is further flexibly connected into the outer accommodation barrel 20 and fixed around the accommodation tube 16, wherein the long orifice 32 corresponds to the upper light permeation aperture 161 for forming a path for light beams (as shown in FIG. 3).

In accordance with the aforesaid characteristics, the outer periphery of outer accommodation barrel 20 is provided with a plurality of equidistant cavities 23, the inner wall surface of an outer ring 33 located in the inner accommodation barrel 20 is provided with a recess 331 for placing a spring 332 and a roller 333 that can be flexibly tugged into the cavities 23, and one of the plurality of connection openings 22, 24 and 26 is positioned to correspond in communication with the long orifice 32 and the upper light permeation aperture 161.

In accordance with the aforesaid characteristics, the plurality of connection openings 22, 24 and 26 at the outer accommodation barrel 20 are connected to binocular connection barrels 41, 42 and 43 having various magnifications, the connection opening 34 of the inner accommodation barrel 30 is connected to a single binocular connection barrel 45, and the horizontal light permeation aperture 15 at the inner body 10 is connected to the binocular barrel 44 (as shown in FIG. 3).

In accordance with the aforesaid characteristics, out of the plurality of connection openings 22, 24 and 26 of the outer accommodation barrel, the connection opening 22 is selectively connected to a semi-transparent ground glass 51, and the connection opening 24 is disposed and connected to a transparent lens 52 having a magnification. The inner accommodation barrel 61 is connected to an outer reflector 60 having an inner surface as a mirror lens, and is connected and fastened into the other connection opening 26 (as shown in FIG. 8 and FIG. 9).

Figure 8:
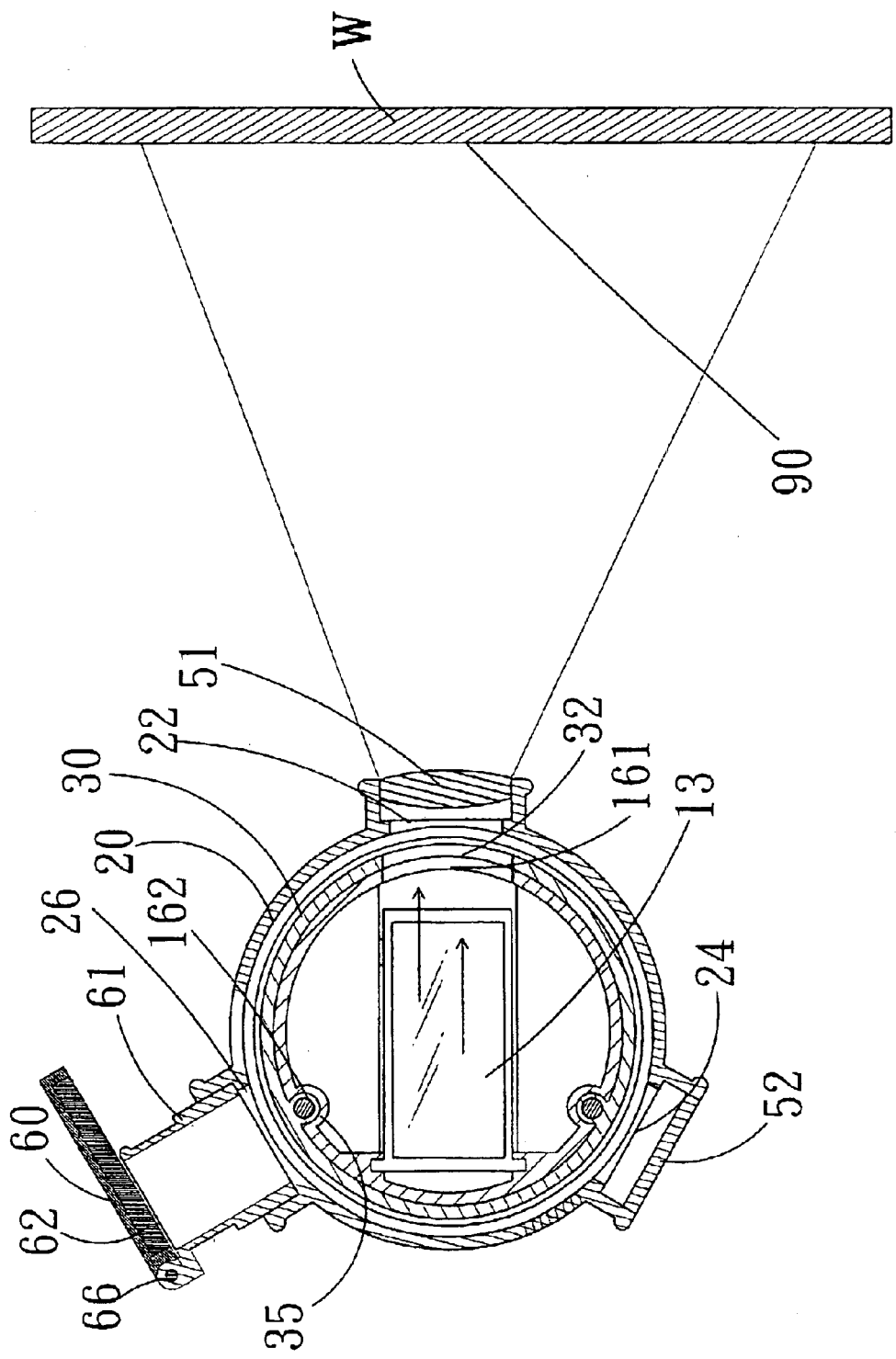
FIG. 8 shows a sectional view according to the invention being implemented to a microscope.
Figure 9:
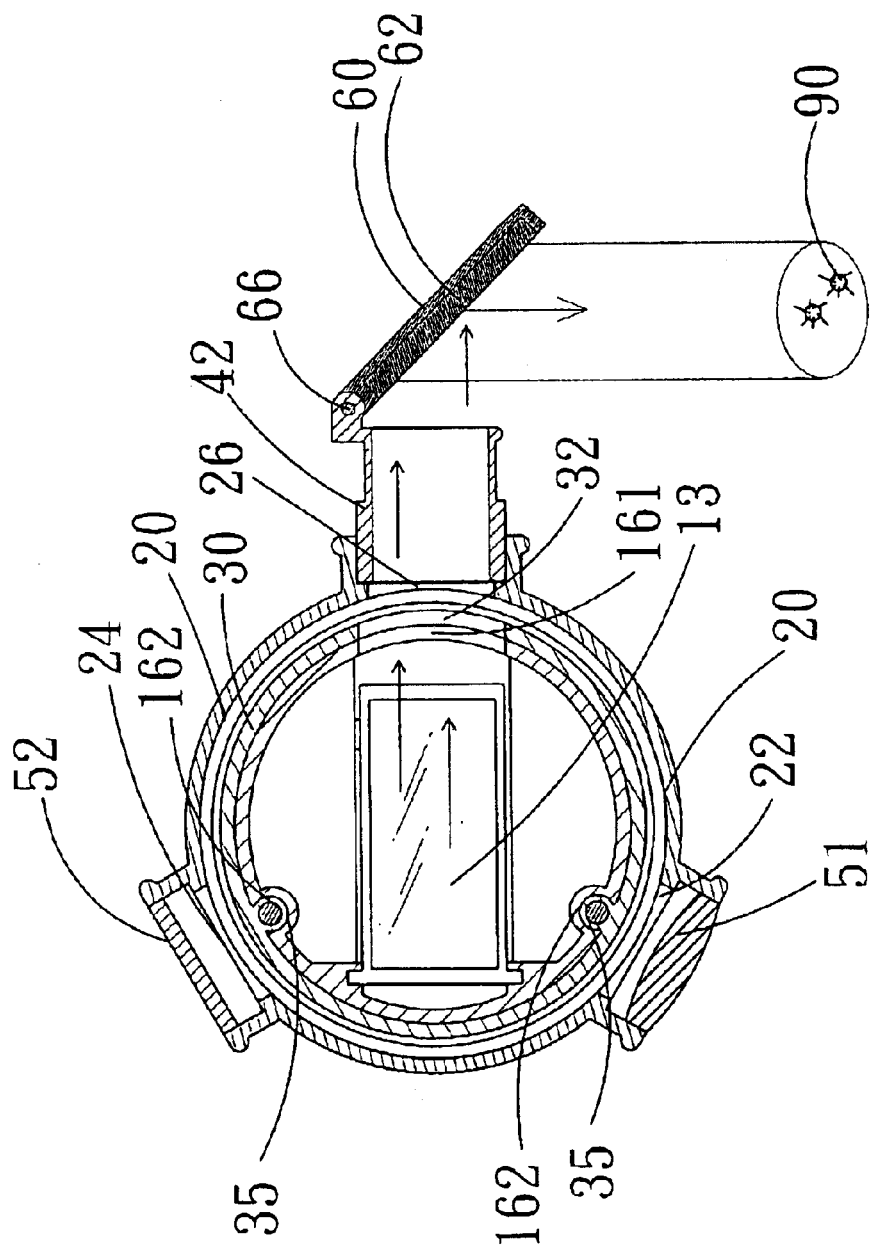
FIG. 9 shows another sectional view according to the invention being implemented to a microscope.

In accordance with the aforesaid characteristics, the surface of the accommodation tube 16 of the inner body 10 is provided with protruding portions 162 for insertting, the surface of the inner accommodation barrel 30 is provided with grooves 35, and the protruding portions 162 are inserted into the grooves 35 to connect the inner accommodation barrel 30 and the inner body 10 (as shown in FIG. 8 and FIG. 9).

To better understand the invention, detailed descriptions shall be given with the accompanying drawings hereunder.

1. Referring to FIGS. 1 and 2, the main features of the invention are that circular motions of the outer accommodation barrel 20 are performed around the arched surface of the inner accommodation barrel 30, and the inner accommodation barrel 30 is connected and fastened for acting upon the outer accommodation barrel 20 using the grooves 35 and the protruding portions 162 while being fixed to the inner body 10. Referring to FIG. 3, when the roller 333 having elasticity rolls in contact with the outer wall surface 231 of the outer accommodation barrel 20, the roller 333 shows a contracted status while being located in the recess 331. When the roller 333 corresponds with and rolls at the cavity 23, it is fitted into the cavity 23 due to the tension of the spring 332 acted upon the roller 333, and thus the outer accommodation barrel 20 is positioned at the arched surface of the inner accommodation barrel 30. In a preferred embodiment according to the invention, at the outer wall surface 231 is provided with three equidistant cavities 23. Whereas one of the cavities 23 positions with the roller 333, one of the three connection openings 22, 24 and 26 is also positioned to correspond to the long orifice 32 and the upper light permeation aperture 161 for forming a path for light beams.

Figure 4:
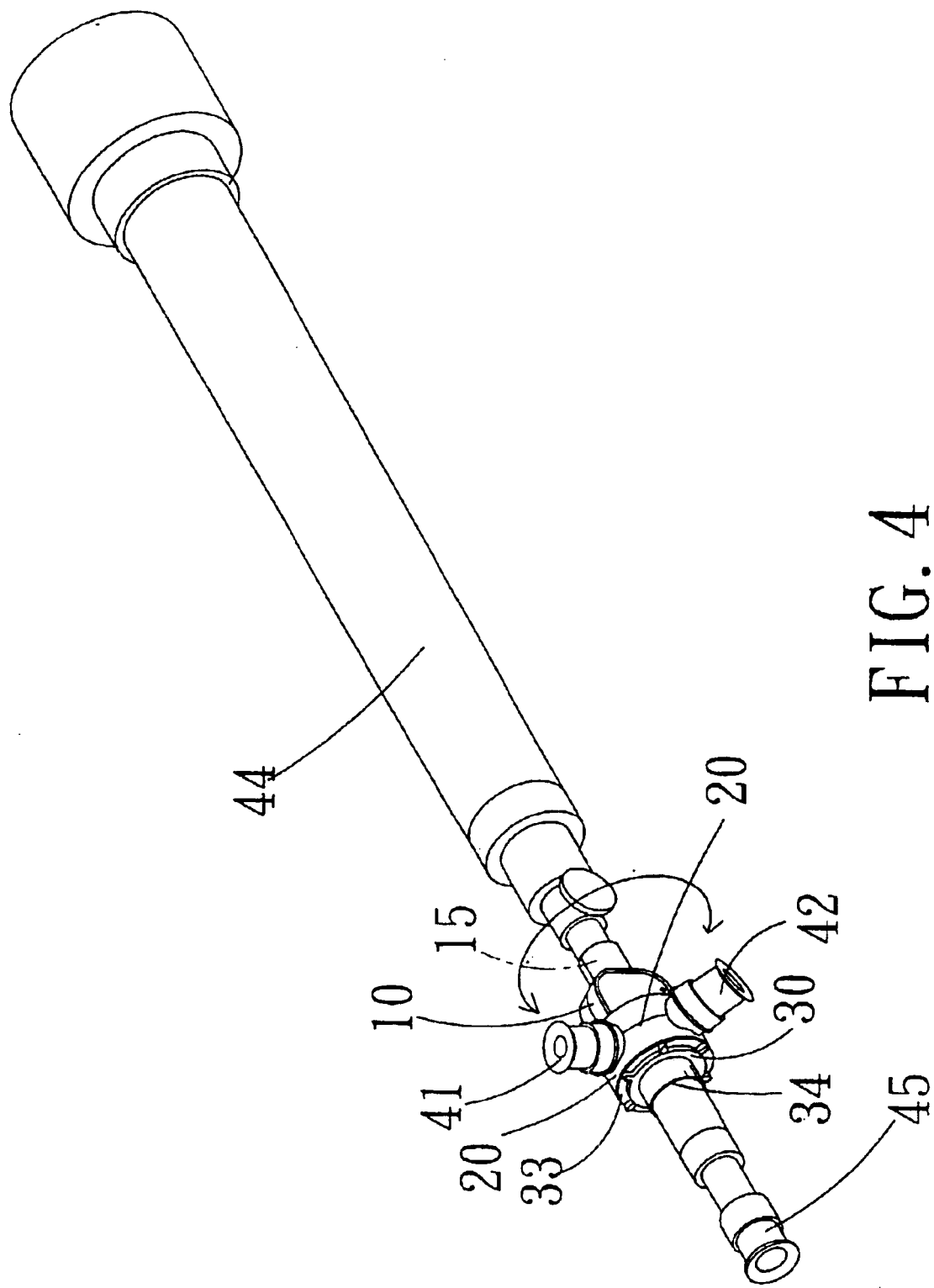
FIG. 4 shows an elevational view according to the invention connected to a binocular barrel.

As shown in FIGS. 2 and 3, the plurality of connection openings 22, 24 and 26 are simultaneously inserted and fixed with the binocular connection barrels 41, 42 and 43 having various magnifications, wherein one binocular connection barrel 41 corresponds to the long orifice 32 and the upper light permeation aperture 161 for forming a path for light beams. The light permeation aperture 15 is connected to a binocular barrel 44 (as shown in FIG. 4), and an internal reflector 13 is disposed at the interior of the inner body 10. The connection relationship and the techniques of angle adjustment of the internal reflector 13 and the inner body 10 are the disclosed in the inventor's U.S. patent application Ser. No. 10/114,096 and therefore shall not be unnecessarily described. The difference is that when the internal reflector 13 is rotated to a dead spot by an adjustment button 70, an angle θ of the internal reflector 13 located within the inner body 10 approaches 45°. Through the light permeation aperture 15, light beams of an image are directed into the binocular barrel 44 onto the internal reflector 13 that further refracts the light beams of the image, such that the light beams of the image take exit through the upper light permeation aperture 161, the long orifice 32 and the binocular connection barrel 41 in sequence, thereby viewing the image using the binocular connection barrel 41. When the user wishes to adjust the size of the image or the viewing range, the outer accommodation barrel 20 is similarly rotated and positioned as the aforesaid description, and the binocular connection barrel 42 or the binocular connection barrel 43 having another magnification subsequently corresponds to the long orifice 32 and the upper light permeation aperture 161, thereby enabling the user to view the image with different sizes and viewing ranges using the binocular connection barrel 42 or the binocular connection barrel 43.

It is to be noted that, the outer connection opening 34 is connected to another binocular connection barrel 45, and so when the internal reflector 13 is adjusted as horizontal in direction with no tilted angle, the inner reflector 13 becomes nonfunctional. The light beams of an image caught by the binocular connection barrel 44 are passed through the light permeation aperture 15 and the outer connection opening 34, and at this point, the binocular connection barrel 45 being employed by the user functions as the prior art. However, when the horizontal binocular connection barrel 45 is in use, the other vertical binocular connection barrels 41, 42 and 43 are closed by a cover 40 (as shown in FIG. 2), so as to have the light beams of the image take exit through the binocular connection barrel 50 as in the prior art.

Therefore, when the binocular according to the invention is in use, and more particularly, when the user employs binocular connection barrels having various magnifications, it is unnecessary to dismantle and assemble binocular connection barrels having various magnifications because only the outer accommodation barrel 20 needs to be rotated for positioning in order to achieve the purpose of using binocular connection barrels 41, 42 and 43 having different magnifications.

Figure 5:
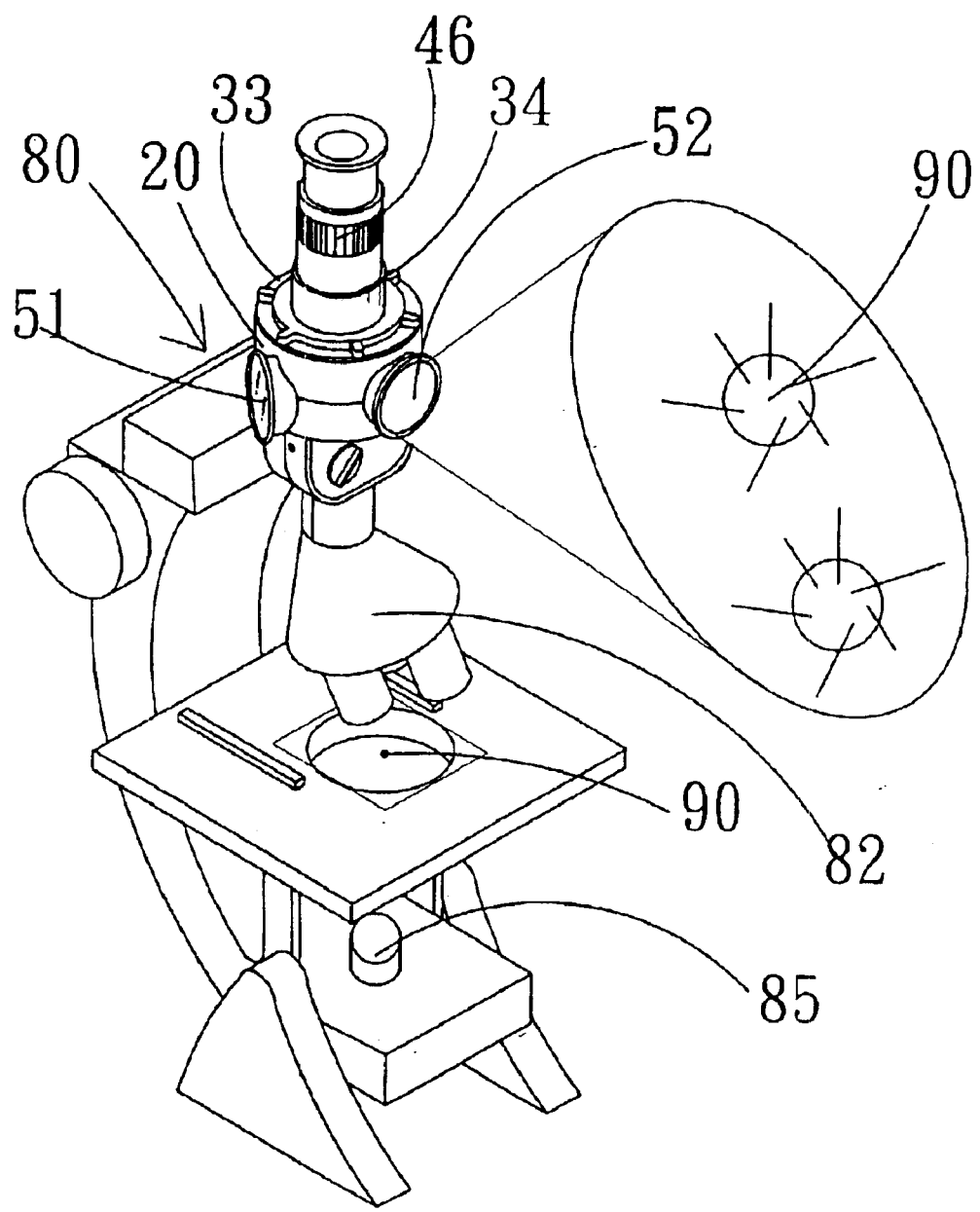
FIG. 5 shows an elevational view according to the invention being implemented to a microscope.
Figure 6:
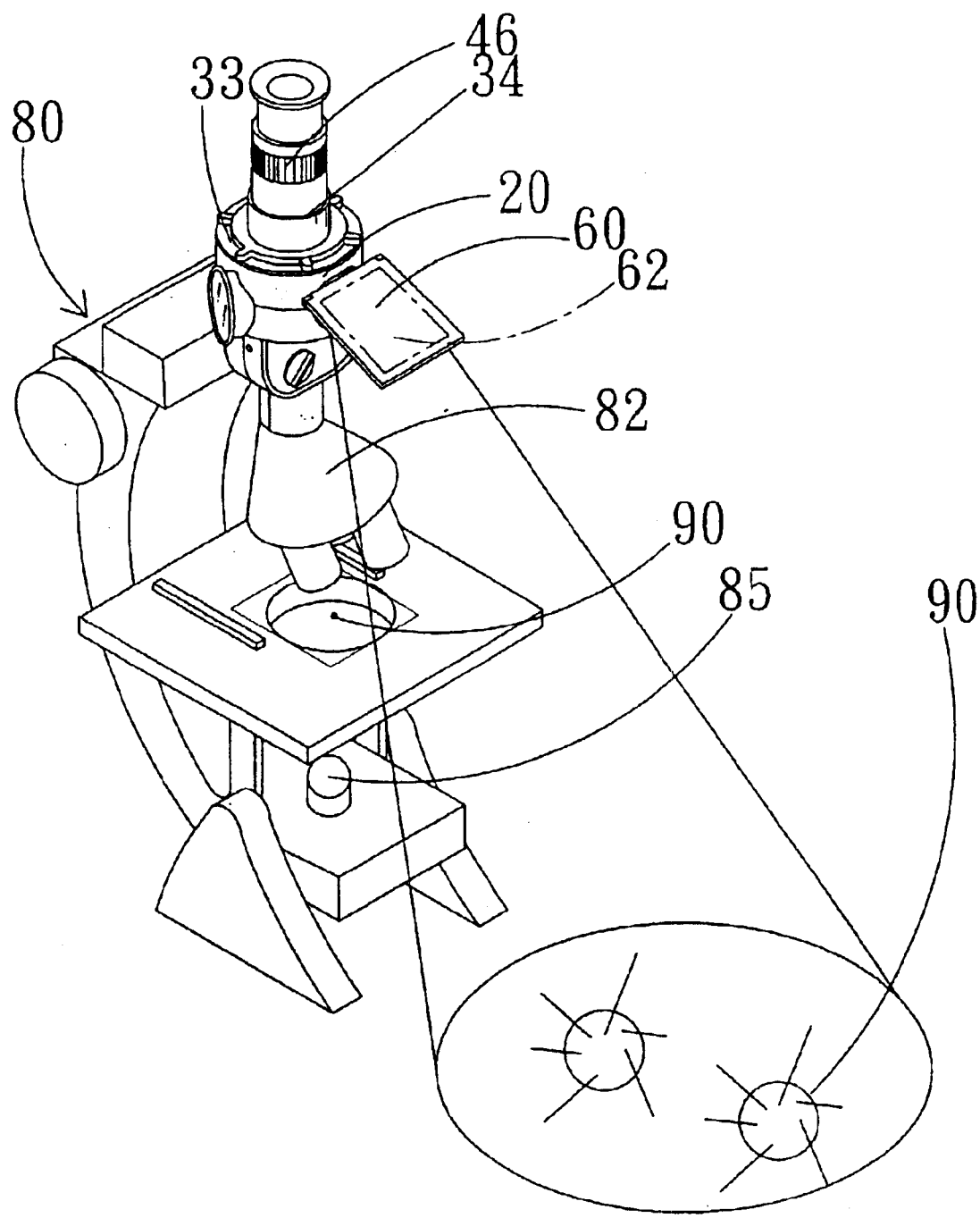
FIG. 6 shows another elevational view according to the invention being implemented to a microscope.

2. Referring to FIG. 1 and FIG. 5, the device in accordance with the invention may also be applied to a microscope 80. The light permeation aperture 15 is connected to a microscope barrel 82, the outer connection opening 34 is connected to a binocular connection barrel 46, and the internal reflector 13 is adjusted and positioned at an angle of 45°. The plurality of connection openings 22, 24 and 26 are disposed and connected with a semi-transparent ground glass 51 a transparent lens 52 and an outer reflector 60, respectively. The microscope barrel 82 may then enlarge with respect to a micro object 90, and the light formed by a lamp 85 which is used for refracting the light beams of the image of the micro object 90 by the internal reflector 13. The light beams subsequently take exit through the upper light permeation aperture 161 and the long orifice 32, thus transmitting the light beams of the image to one of the plurality of connection openings 22, 24 and 26. For cases where the connection opening 22 corresponds to the upper light permeation aperture 161 and the long orifice 32, the semi-transparent ground glass 51 forms a screen for displaying the enlarged image of the micro object 90 after the light beams of the image are refracted by the inner reflector 13 (as shown in FIG. 5 and FIG. 8). For cases where the connection opening 24 is adjusted to correspond to the upper light permeation aperture 161 and the long orifice 32, the enlarged image of the micro object 90 takes exit through the transparent lens 52 after the light beams of the image are refracted by the internal reflector 13. The directed image is projected onto a vertical wall W, and therefore the enlarged image of the micro object 90 may be displayed onto the vertical wall W. Referring to FIG. 9, for case where the connection opening 26 corresponds to the upper light permeation aperture 161 and the long orifice 32, the light beams of the image are directed onto the mirror plane 62 of the outer reflector 60 after being refracted by the inner reflector 13. Because the outer reflector 60 rotates tightly regarding a bolt 66 as the rotation axis thereof, by adjusting the tilted angle of the outer reflector 60 may position the mirror plane 62 at an appropriate angle, so as to accurately refract the light beams of a caught image onto a horizontal table surface.

Figure 7:
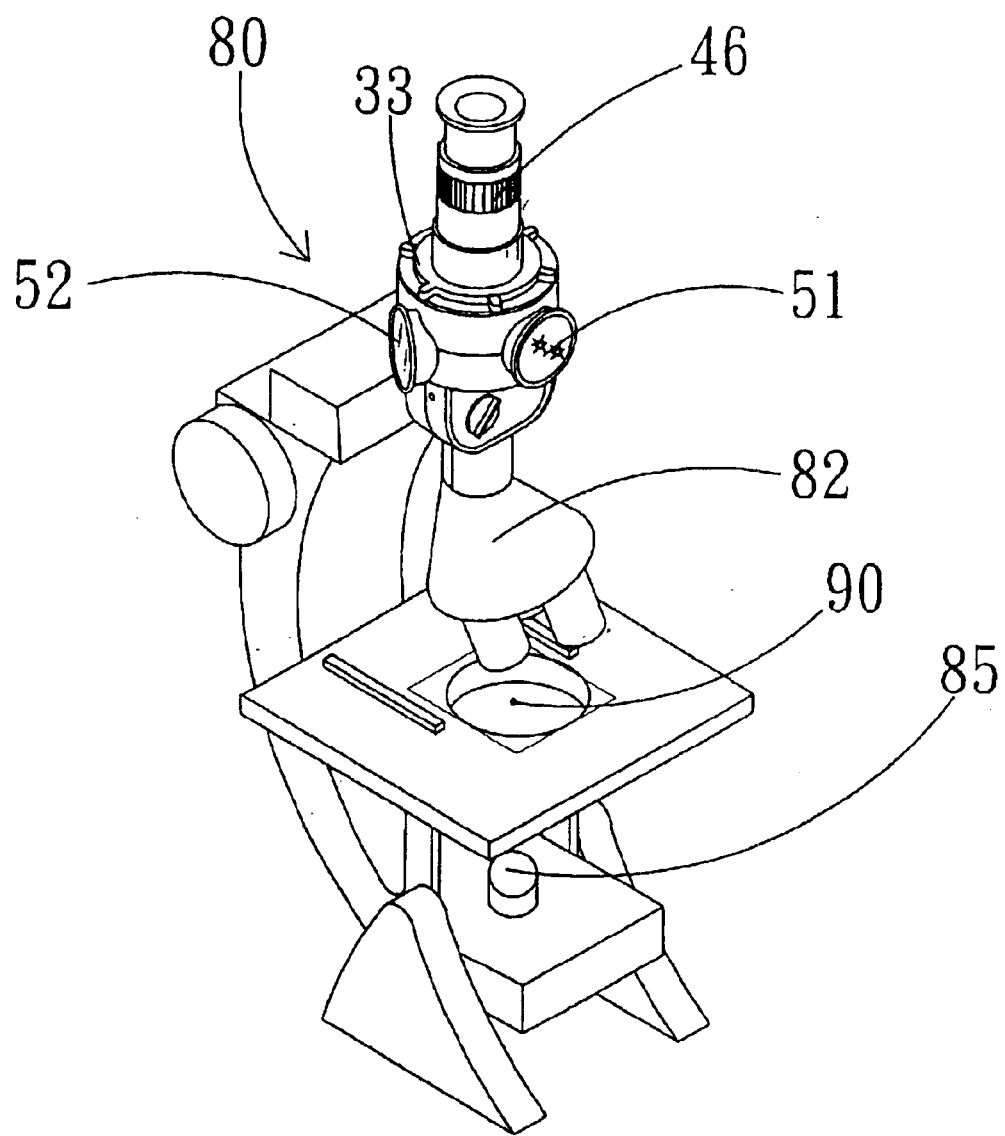
FIG. 7 shows another elevational view according to the invention being implemented to a microscope.

When the inner reflector 13 is adjusted as being a horizontal plane having no refraction effects, the microscope is restored to function as a prior art; that is, the image of the micro object 90 may be view by the eyes of the user through the binocular connection barrel 46 (as shown in FIG. 7).

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A device capable of exchanging image projection directions comprising:
    an inner body consisted of a right and a left housings, an internal reflector having adjustable angles disposed in the inner body, and a horizontal light permeation aperture; is characterized that:
    an accommodation tube formed at the rear of the inner body and an upper light permeation aperture formed at the top of the accommodation tube;
    an outer accommodation barrel disposed with at least two connection openings at the outer periphery thereof;
    an inner accommodation barrel disposed with a long orifice and an outer connection opening at the outer periphery thereof, and is further flexibly connected into the outer accommodation barrel and fixed around the accommodation tube, wherein the long orifice corresponds to the upper light permeation aperture for forming a path for light beams, and
    wherein the surface of the accommodation tube of the inner body is provided with protruding portions for tugging, the surface of the inner accommodation barrel is provided with grooves, and the protruding portions are tugged into the grooves to connect the inner accommodation barrel to the inner body.

2. A device capable of exchanging image projection directions in accordance with claim 1, wherein the outer periphery of outer accommodation barrel is provided with a plurality of equidistant cavities; and the inner wall surface of an outer ring located in the inner accommodation barrel is provided with a recess for placing a spring and a roller that can be flexibly tugged into the cavities, and one of the plurality of connection openings is positioned to correspond in communication with the long orifice and the upper light permeation aperture.

3. A device capable of exchanging image projection directions in accordance with claim 1, wherein the plurality of connection openings at the outer accommodation barrel are connected to binocular connection barrels having various magnifications; the connection opening of the inner accommodation barrel is connected to a single binocular connection barrel; and the horizontal light permeation aperture at the inner body is connected to the binocular barrel.

4. A device capable of exchanging image projection directions in accordance with claim 1, wherein one of the plurality of connection openings of the outer accommodation barrel is connected to a semi-transparent ground glass, and another connection opening is disposed and connected to a transparent lens having a magnification; and the inner accommodation barrel is connected to an outer reflector having an inner surface as a mirror lens, and is connected and fastened into the other connection opening.

* * * * *

UNITED STATES PATENT AND TRADEMARK OFFICE
CERTIFICATE OF CORRECTION

PATENT NO.         : 6,909,541 B2
APPLICATION NO. : 10/390633
DATED                : March 19, 2003
INVENTOR(S)       : Su-Min Kung It is certified that error appears in the above-identified patent and that said Letters Patent is hereby corrected as shown below:

On the Title Page (75) "Inventor: Su-Min Kung, Shi-Jr (TW)" should read -- "Inventor: Su-Min Kung, Hsi Chih (TW)" --

On the Title Page (73) "Assignee: Hunter Optical Co., Ltd., Taipei Hsien (TW)" should read -- "Assignee: Hunter Optical Co., Ltd., Hsi Chih (TW)" --

Signed and Sealed this

Twenty Second Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 6,909,541 B2
APPLICATION NO. : 10/390633
DATED : June 21, 2005
INVENTOR(S) : Su-Min Kung Page 1 of 1

It is certified that error appears in the above-identified patent and that said Letters Patent is hereby corrected as shown below:

On the Title Page (75) "Inventor: Su-Min Kung, Shi-Jr (TW)" should read -- "Inventor: Su-Min Kung, Hsi Chih (TW)" --

On the Title Page (73) "Assignee: Hunter Optical Co., Ltd., Taipei Hsien (TW)" should read -- "Assignee: Hunter Optical Co., Ltd., Hsi Chih (TW)" --

This certificate supersedes the Certificate of Correction issued April 22, 2008.

Signed and Sealed this

Twentieth Day of May, 2008

JON W. DUDAS
*Director of the United States Patent and Trademark Office*